(12) United States Patent
Berkcan et al.

(10) Patent No.: US 6,474,155 B1
(45) Date of Patent: Nov. 5, 2002

(54) CONSTANT-TEMPERATURE-DIFFERENCE FLOW SENSOR

(75) Inventors: Ertugrul Berkcan, Niskayuna, NY (US); Scott Baxter Hoyle, Maple Shade, NJ (US)

(73) Assignee: Lockheed Martin Corporation

( * ) Notice: Subject to any disclaimer, the term of this patent is extended or adjusted under 35 U.S.C. 154(b) by 0 days.

(21) Appl. No.: 09/349,576

(22) Filed: Jul. 8, 1999

(51) Int. Cl.[7] .............................................. G01F 1/68
(52) U.S. Cl. .............................. 73/204.23; 73/204.15; 73/204.26
(58) Field of Search ..................... 73/204.23, 204.15, 73/204.26, 204.16, 204.18, 861.79, 204.25, 204.27; 374/31

(56) References Cited

U.S. PATENT DOCUMENTS

| | | | |
|---|---|---|---|
| 5,848,094 A | * | 12/1998 | Buhl et al. ..................... 374/31 |
| 5,936,156 A | * | 8/1999 | Roberts .................... 73/204.19 |
| 5,948,978 A | * | 9/1999 | Feller ....................... 73/204.15 |
| 6,019,003 A | * | 7/2000 | Weider ...................... 73/861.79 |
| 6,085,588 A | * | 7/2000 | Khadkikar et al. ....... 73/204.27 |

* cited by examiner

*Primary Examiner*—Harshad Patel
(74) *Attorney, Agent, or Firm*—Duane Morris LLP

(57) ABSTRACT

An integrated sensor for automated systems includes a flow sensor, a temperature sensor, and a network interface. In a particular embodiment of the invention, the flow sensor includes a temperature sensor (26) which determines the temperature of the fluid flowing in a flow path (12). A heater (18) is coupled to the flow path, and is energized by a controller (20) with sufficient electrical power to raise the temperature of the heater above the measured fluid temperature by a fixed temperature difference. In order to aid in determining the temperature difference, a sensor (24) may be associated with the heater (18). The amount of power required to maintain the temperature difference is a measure of the flow velocity. The volumetric flow rate is the product of the flow velocity multiplied by the area of the flow sensor. The mass flow rate is the product of the volumetric flow rate multiplied by the mass density of the fluid.

16 Claims, 7 Drawing Sheets

CONSTANT-TEMPERATURE-DIFFERENCE FLOW SENSOR

FIELD OF THE INVENTION

This invention relates to flow sensors for fluids, and more particularly to such sensors in which a heater is maintained at a constant temperature differential above the temperature of the flowing fluid.

BACKGROUND OF THE INVENTION

Modern ships employ crew members whose function is to monitor various parts of the vessel, and to operate equipment such as hoists, radar, bridge equipment, and to monitor and control valves located throughout the ship. The costs associated with maintaining a large crew are disadvantageous, and such costs include the costs associated with paying wages, maintaining the crew member in terms of food and life support (bathrooms, hot water, and the like), and also includes the costs of training the crew member for the particular job. To the extent that a ship's functions can be automated, the necessary crew can be reduced.

The problem is particularly acute in war vessels, as a relatively large crew must be maintained in order to have the resources to perform battle damage repair and recovery.

If reliable and inexpensive flow sensors were available, such sensors could be located in various pipes within a ship or a factory, and their readings could be compared to determine if there were a break in the intervening pipe or flow path. Such inexpensive sensors could also be used to improve process controls in chemical and other processes. Present-day flow sensors include rotating-propeller or linear types, differential-pressure aperture, ball-in-tapered-tube, vane or deflection type, ultrasonic, and hot-wire anemometer. The rotating-propeller is very accurate, but may degrade over time as a function of corrosion and deposits, and may fail catastrophically in the presence of large debris. The differential-pressure type of flow sensor requires an obstructing aperture or change of geometry of the flow path, which is very undesirable, and when the application requires many such sensors to be cascaded, may substantially impede the flow. Also, the small pressure changes attributable to relatively large apertures may undesirably introduce noise into the measurement. The ball-in-tube type requires a vertical orientation, and the tube must be transparent in order to optically detect the location of the ball. Additionally, in a vehicle which has vertical motion, the vertical acceleration tends to add to the gravitational force acting on the ball, and will tend to affect the reading, and therefore the accuracy. The vane deflection type of flow sensor obstructs the flow with the vane, and is not known for their accuracy. The ultrasonic type does not necessarily impede the flow, but is expensive, and may not be suitable for use in a noisy environment, or in an environment in which many such sensors are in use, so that the ultrasonic signals of one affect the others in the same flow path. The hot-wire anemometer is not known for use in fluids other than air, would not work in a conductive fluid, and the thin wire would be subject to breakage by circulating debris in some applications. Some approaches such as the propeller & differential pressure based ones impose stringent installation requirements such as a pipe having a length of many pipe diameters preceding the active portion, for flow straightening prior to the sensor; this may not be acceptable in some applications.

Improved flow sensors are desired.

SUMMARY OF THE INVENTION

A flow sensor according to an aspect of the invention includes a path for the flow of fluid in a region. The fluid should have a known specific heat or value of temperature change per unit mass per unit of energy. A temperature determining means or temperature sensor is coupled to the path for making a determination of the upstream temperature of a fluid flowing in the path, or at least the approximate upstream temperature should be known. Ordinarily, the temperature determination is made by a thermal sensor coupled to the flow path at an upstream location. A heating means or heater is coupled to the path, for heat transfer with the fluid. A control arrangement is coupled to the heater and to the temperature determining means, for applying power to the heater in an amount selected or required to raise the temperature of the heater above the upstream temperature by a predetermined amount, and for converting the value of the power into a corresponding flow value.

In a preferred embodiment of the invention, the control means includes a temperature determining means coupled to the heater, for determining the temperature of the heater. In a most preferred embodiment, the heater is an electrical resistor, and the heater temperature determining means comprises electrical resistance measuring means coupled to the heater for measuring the electrical resistance of the heater, and the control means comprises means for converting the value of the resistance into a corresponding temperature of the heater.

The control means preferably includes a memory preprogrammed with a value corresponding to the cross-sectional area of the path, and the flow determination is generated in the form of one of mass quantity per unit time and volume per unit time.

A method according to another aspect of the invention includes the steps of estimating, determining or setting the temperature of a fluid flowing in a path, and applying power to a heater thermally coupled to the flow for raising the temperature of the heater by a fixed temperature differential above the temperature of the fluid. Using at least information equivalent to or corresponding to the specific heat of the fluid, the exposed area of the heater, the amount of power required to sustain the temperature differential, the power transfer characteristics per unit area of the heater to the fluid, and the exposed area of the heater, determining the fluid flow. The flow may be given in terms of volumetric flow, by the use of the fluid flow together with information equivalent to the cross-sectional area of the path. The flow may be given in terms of mass flow, by the use of the volumetric flow, in combination with information equivalent to the mass density of the fluid.

By changing the memorized information relating to the physical characteristics of the fluid, the application of the flow sensor to different fluids can be changed.

BRIEF DESCRIPTION OF THE DRAWING

FIG. 1b is a representation of a cross-section of a portion of the structure of FIG. 1a;

DESCRIPTION OF THE INVENTION

Figure 1A:
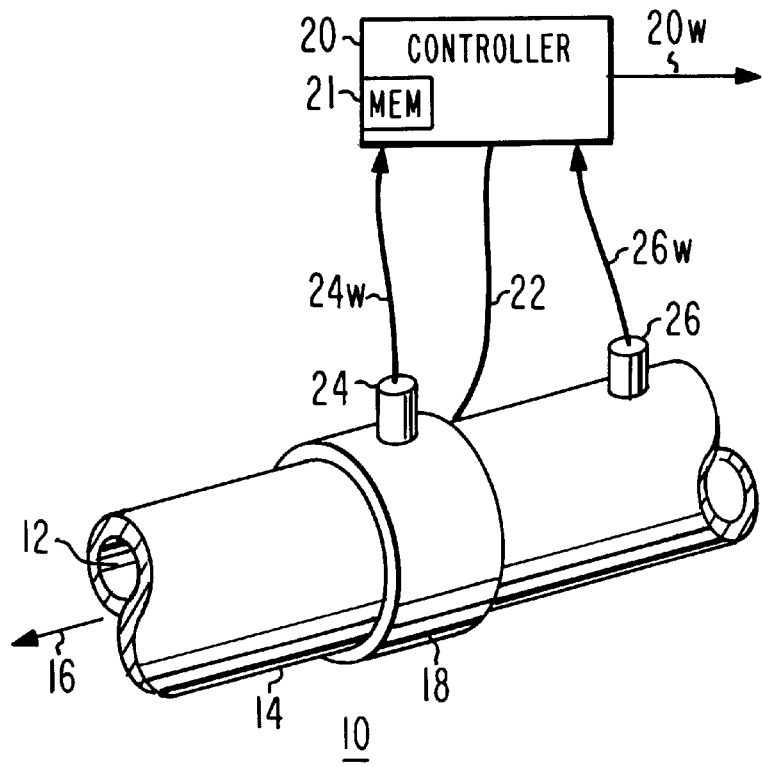
FIG. 1a is a simplified diagram of a flow sensor according to an aspect of the invention, which uses a heater, two temperature sensors, and a controller.

In FIG. 1a, a sensor 10 includes a fluid path 12 in the form of a round pipe 14 through which fluid flows in a direction designated by an arrow 16. Sensor 10 supports an annular peripheral electrical heating element or heater 18. A flow of electrical energy or power is applied to heater 18 from a controller 20 by way of a set 22 of wires. A temperature sensor 24 is coupled to heating element 18, for producing a signal representing the temperature of the heating element. The temperature-representative signal is applied to controller 20 by way of a set of wires 24w. Controller 20 includes a memory designated 21. A further temperature sensor 26 is mounted to pipe 14 at a location upstream from heating element 18, for sensing the temperature of the fluid flowing in pipe 14, and for generating a signal representing the temperature of the fluid. The signal representing the temperature of the fluid is applied over a set of wires 26w to controller 20.

Figure 1B:
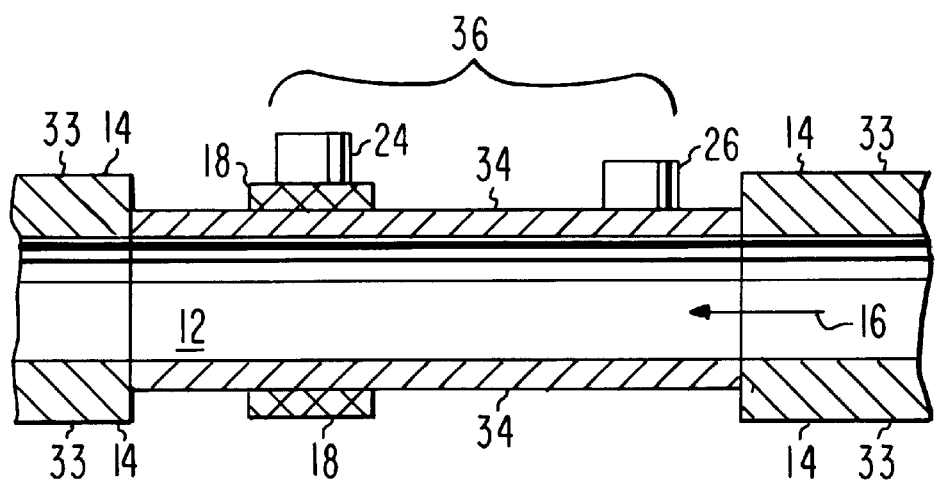

FIG. 1b is a representation of a cross-section of the structure of FIG. 1a. In FIG. 1b, the wall of pipe 14 is made from conventional materials, designated as 33. The conventional materials may, depending upon the temperature and pressure of the fluid flowing in path 12, be materials such as brass, galvanized steel, stainless steel, or composite materials. In the sensing region 36, the pipe wall can be made of the same material 33 as pipe 14 or can be made from a high-strength material 34, as for example titanium, which can be substantially thinner in cross-section than the conventional materials 33. This thinner cross-section, in turn, generally translates into a better thermal transfer properties between the heater 18, the sensors 24 and 26, and the fluid within the sensing region 36. The sensing region 36 is connected to pipe 14 by using standard connecting techniques.

In operation of the sensor 10 of FIG. 1a, the velocity of the flow of fluid within pipe 14 is determined by sensing the upstream fluid temperature with sensor 26, and applying electrical energy from the controller 20 to the heating element 18 at a rate sufficient to raise the temperature of the heating element, as measured by sensor 24, to a second temperature, greater than the upstream-fluid temperature by a fixed temperature difference. The measurement of power or the time rate of energy required to maintain the fixed temperature difference is an indication of the velocity of fluid flow in the fluid path.

In an alternate embodiment that provides a lower cost, but lower accuracy solution, upstream fluid temperature is estimated, based on details of the system into which the sensor is installed. For example, if the upstream fluid comes from the bottom of a lake at which the water temperature always remains at about 55° F., the upstream temperature measurement is not needed, and the upstream temperature may be assumed. This estimation obviates the need for sensor 26. All calculations are then based on the assumed upstream temperature.

In yet another alternate embodiment, the heater 18 of FIG. 1a is turned off periodically and allowed to attain the fluid temperature to provide the ambient, or upstream value. This heater-ON to heater-OFF duty cycle or period depends upon the thermal characteristics of the fluid, the sensor wall 14 (or 34 of FIG. 1b) and the expected temperature range of the fluid.

Once the fluid flow rate is known in the arrangement of FIG. 1a, the volume flow rate (gallons per minute, for example) is easily determined to be the product of the effective cross-section of the fluid path (the diameter of the pipe, taking into account boundary effects) multiplied by the flow velocity. Given the density of the fluid, the mass flow rate (kilograms per second, for example) is easily determined as the product of the volume flow rate multiplied by the density of the fluid. Controller 20 produces a signal representing one (or all) of fluid velocity, volume flow rate, and mass flow rate, and applies it over a signal path 20w to a remote indicator (not illustrated).

Figure 2:
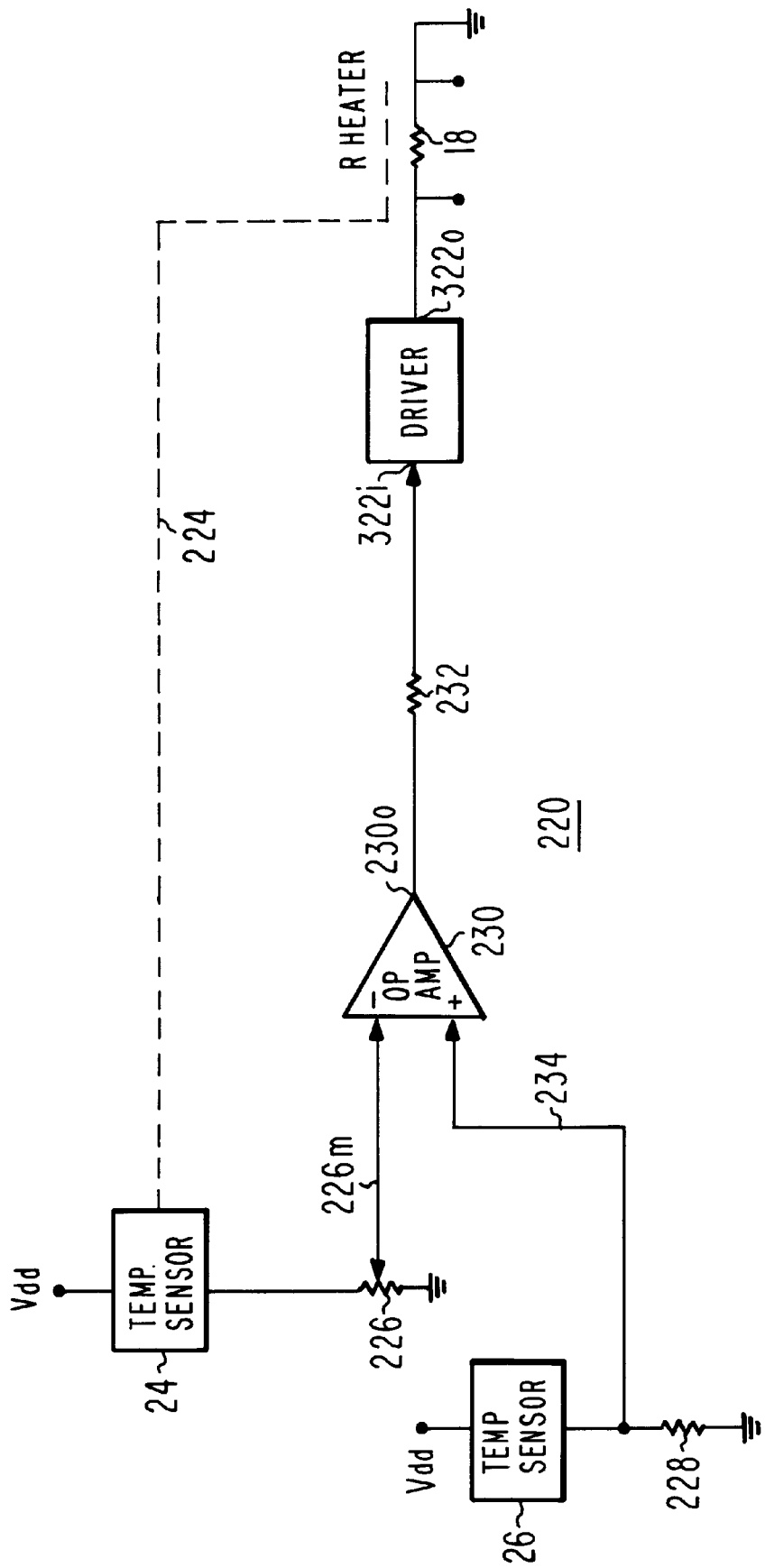
FIG. 2 is a simplified schematic diagram of an analog temperature controlling circuit.

FIG. 2 is a simplified schematic diagram of an analog embodiment of a temperature controller 220 which may be used in controller 20 of FIG. 1a to maintain the heater temperature at a fixed value above the temperature of the upstream fluid. In FIG. 2, heater 18 is illustrated as a resistor having a resistance designated as $R_{heater}$. One end of resistor 18 is grounded, and the other is connected to the output port 322o of a driver circuit 322. In practice, driver circuit 322 may be as simple a circuit as a power field-effect transistor having its source connected to output port 322o, its drain connected to a supply voltage source, and its gate coupled to resistor 232. Resistor 18 of FIG. 2 is thermally coupled to temperature sensor 24, as illustrated by dash-line path 224. Sensor 24 is connected with a tapped resistor 226 as a voltage divider coupled between a bus Vdd and ground. Similarly, sensor 26 is connected with a resistor 228 as a voltage divider coupled between Vdd and ground. If the sensors 24 and 26, and their associated resistors 226 and 228, respectively, are matched to each other, the same voltage will appear across the resistors 226 and 228. If the temperature of heating element 18 were to be slightly higher than that measured by sensor 26, sensor 24 would have a slightly lower resistance than sensor 28, and the voltage across resistor 226 would be slightly greater than the voltage across resistor 228.

An operational amplifier 230 of FIG. 2 has its output port 230o coupled, by way of a limiting resistor 232, to the input port 322i of driver circuit 322. Amplifier 230 has its non-inverting (+) differential input port coupled by way of a path 234 to the junction of sensor 26 and resistor 228, for sensing the reference voltage, and the inverting (−) differential input port of amplifier 230 is connected to the movable tap 226m of resistor 226. The movable tap 226m can be set so that, when the temperature sensed by sensor 24 is slightly greater than the temperature sensed by sensor 26, the voltages at the inverting and noninverting input ports of amplifier 230 are essentially equal. Those skilled in the art will recognize the arrangement of FIG. 2 as a simple feedback control circuit, which tends to maintain the amount of current through heating element 18 at a value which results in a constant temperature. Simple filters can be used in conjunction with operational amplifier 230 to control the time constant of the feedback circuit. When the tap 226m of resistor 226 is set to sense a slightly lower voltage than that across resistor 226 as a whole, the feedback circuit 220 of FIG. 2 will act to maintain the heating element 18 at a temperature which is higher by a preset amount with respect to the temperature sensed by sensor 26. Thus, the position of tap 226m of resistor 226 can be used to set or adjust the amount by which temperature of heating element 18 is kept above the temperature sensed by sensor 26 in an analog feedback circuit such as circuit 220 of FIG. 2.

Figure 3:
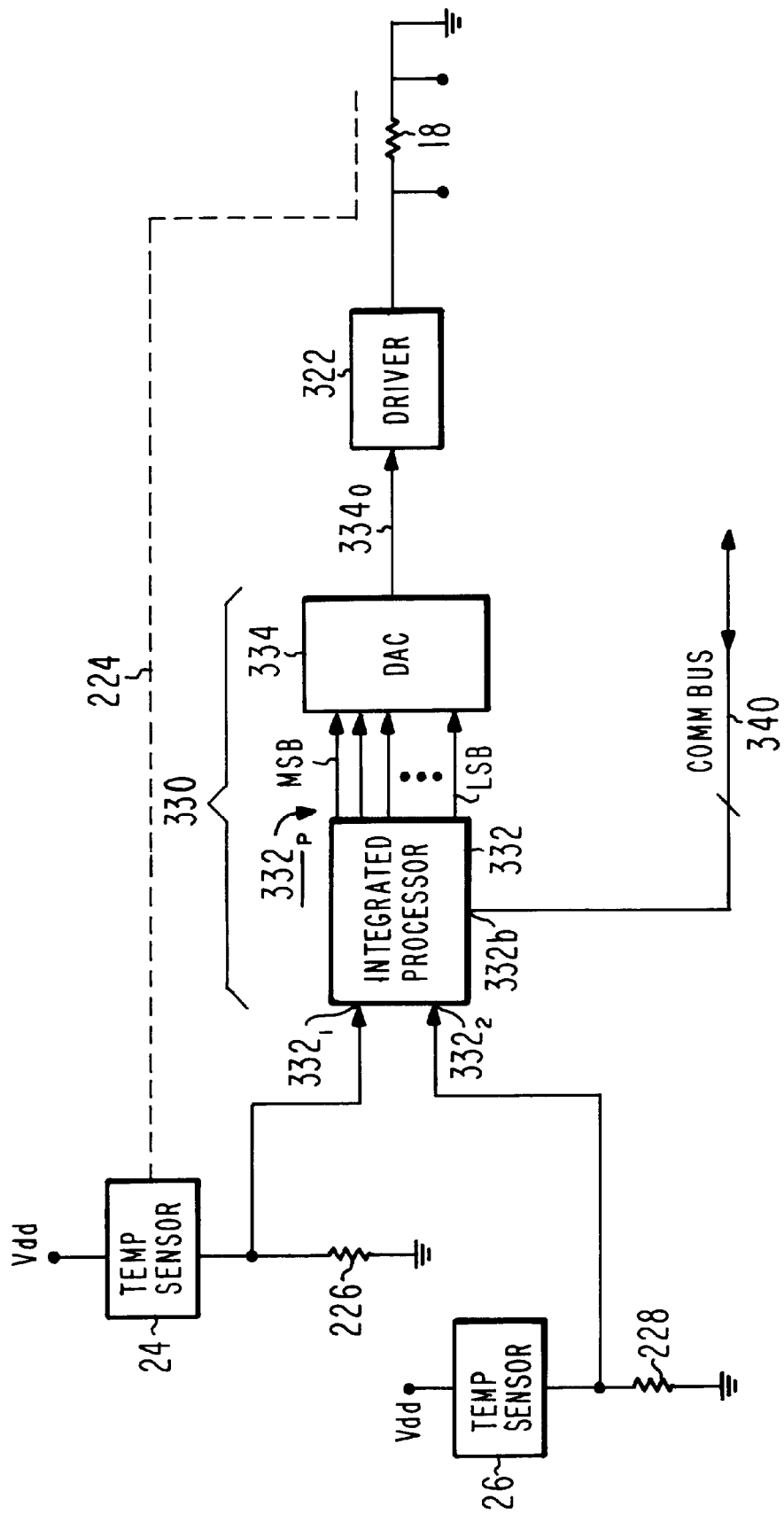
FIG. 3 is a simplified schematic diagram of a digital-based temperature controlling circuit using a digital-to-analog converter.

FIG. 3 differs from FIG. 2 in that a digital circuit 330 replaces the analog operational amplifier 230 In FIG. 3, digital circuit 330 includes an integrated processor 332 which includes analog input ports $332_1$ and $332_2$ to which the temperature reference signals are applied from temperature sensors 24 and 26, respectively. Processor 332 also includes a set of ports designated generally as $332_p$, at which the various bits of a digital signal are accessed. Thus, one of the individual ports of set $332_p$ is designated as carrying the least-significant bit (LSB), another as carrying the most-significant bit (MSB), and the other ports (not designated) carry bits of intermediate significance. The bit signals carried by the ports of set $332_p$ are applied to the input ports of a digital-to-analog converter (DAC) 334, which, as known, converts the digital signals into a corresponding analog signal on output signal path 334o The analog signal is applied to driver circuit 322 The integrated processor 330 of FIG. 2 may be a specialized integrated device such as Neuron processor MC143150 or the like, made by Motorola company of Schaumburg, Ill. under license from Echelon Company of Palo Alto, Calif. These processors are convenient for such use, because they include several desired functions, and further include a communication interface, illustrated as 332b in FIG. 3, which can be connected to a communication channel 340 (such as twisted pair, power line carrier, RF or similar) in an automated system.

In operation of the arrangement of FIG. 3, the integrated processor 332 calculates an output voltage based on the sensed temperatures 24 and 26, and outputs a digital value on signal paths 332p, which value is then converted by digital-to-analog converter (DAC) 334 into an analog version of this voltage. In essence, the processor 332 performs the function of a feedback control circuit, which will maintain the amount of current through heating element 18 sufficient to maintain a specified value above the temperature measured by sensor 26. Compared to the feedback circuit using the Op-Amp 230 in FIG. 2, however, this feedback is programmable or software adjustable (such as the temperature difference between the heater or for different fluid), and independent of the setting of a variable resistor, such as 226 in FIG. 2. Consequently, no adjustable voltage divider is necessary in the arrangement of FIG. 3.

Figure 4:
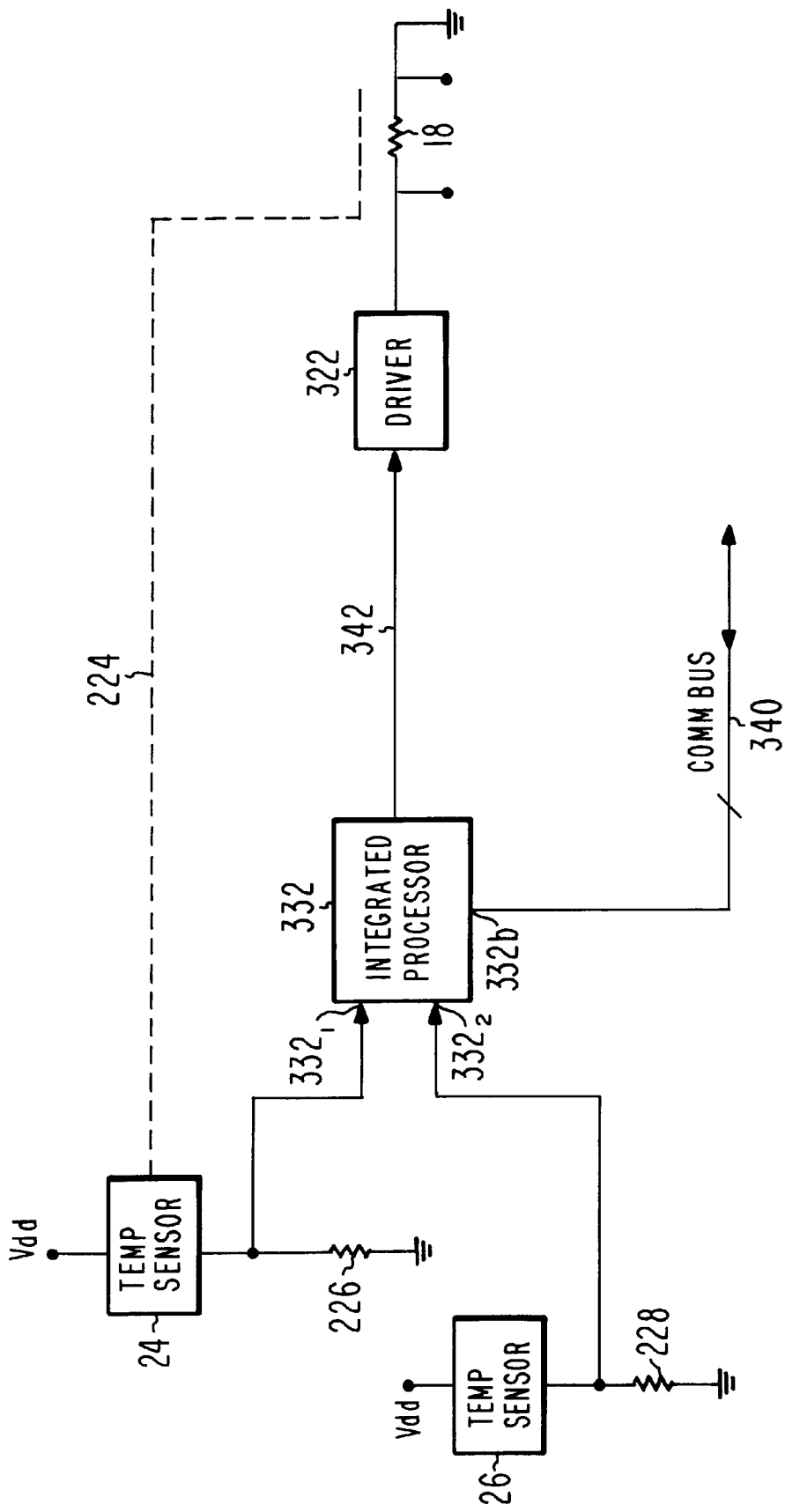
FIG. 4 is a simplified schematic diagram of a digital-based temperature controlling circuit using pulse-width modulation to eliminate the need for the DAC of FIG. 3.

FIG. 4 is similar to FIG. 2, but the processor 332 is arranged to produce, on signal path 342, a bi-level pulse-width modulated output signal representative of the desired power or current to be applied to resistor 18. The pulse-width modulated signal is applied to the input of driver circuit 322. The heating element 18 in this circuit is driven by full-amplitude PWM signal rather than by a modulated-amplitude quantized-analog signal. This allows a direct connection between the integrated processor 332 and the driver circuit 322, and thereby eliminates the need for the digital-to-analog converter 334 designated in FIG. 3. When automated systems are to be used, it is often desirable to minimize the cost of each sensor. Deletion of the digital-to-analog converter aids in reducing cost and complexity of the assembly, and the simplification and reduction in the number of parts may be expected to improve reliability. Alternatively, a simple sold-state processor can be used. Moreover, a PWM type of output is readily available from a number of commercially available processors at little or no additional cost.

Figure 5:
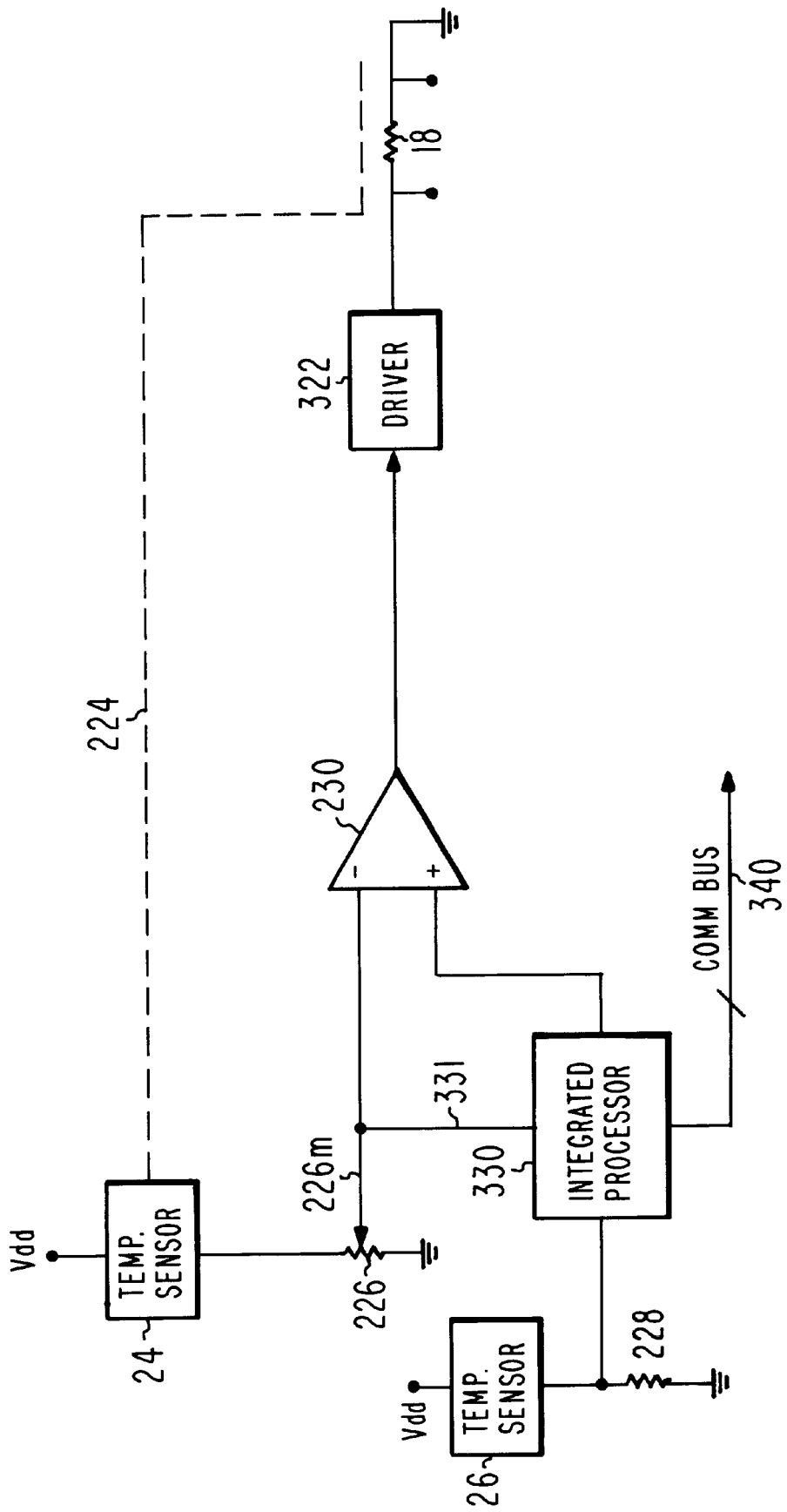
FIG. 5 is a simplified schematic diagram of a temperature controller in which one of the signals representing sensed temperature is digitized and reconverted to analog form.

FIG. 5 is a hybrid analog/digital temperature controller which may be used in the controller 20 of FIG. 1a. In FIG. 5, heater 18 is driven by driver block 322, which in turn is controlled by the analog output signal from an operational amplifier 230. The inverting input port of amplifier 230 is connected to the movable tap 226m on resistor 226, and resistor 226 is connected in series with temperature sensor 24 between voltage source Vdd and ground. Temperature sensor 26 is connected with resistor 228 as a voltage divider, and the voltage at the tap is applied to an integrated processor 330, which converts the analog voltage across resistor 228 into digital form, and provides the digital information to system bus 340. Movable tap 226m is connected to integrated processor 332 by a path 331 so as to make the temperature sensed by sensor 24 available to the system bus. The analog output signal of Neuron chip or processor module 330 is connected to the noninverting input port of amplifier 230. The operation of the arrangement of FIG. 5 is similar to that of the arrangements of FIGS. 2, with the only difference lying in the digitization of the voltage across resistor 228, and the reconversion of the digitized value to analog form for application to amplifier 230. It will be apparent that the connection to the operational amplifier through the digital circuits 330 can be made for the temperature 24 instead of temperature 26. In this latter version, then the variable resistor 226 can be replaced by a fixed resistor.

Figure 6:
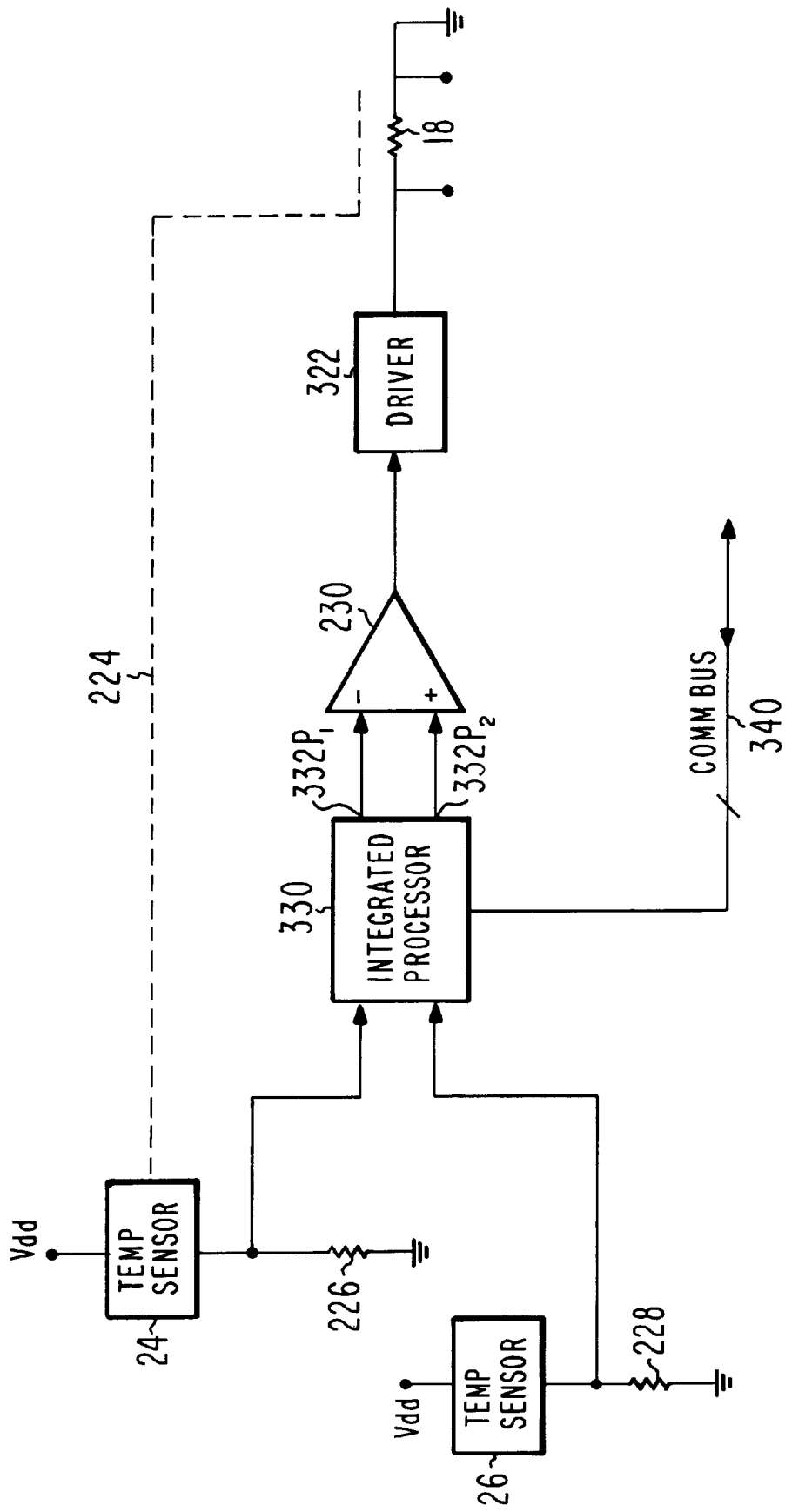
FIG. 6 is a simplified schematic diagram of a temperature controller similar to that of FIG. 5, in which both temperature signals are digitized.

FIG. 6 illustrates an arrangement similar to that of FIG. 5, in which both the temperature-representative signals from resistors 226 and 228 are digitized within Neuron processor or integrated processor 330, and reconverted into analog form for application to the amplifier 230. In view of the detailed descriptions of FIGS. 2, 3, 4, and 5, it is only necessary to state that the module with the integrated processor 330 includes two analog input ports, one for each temperature-related signal, and two analog output ports, designated $332P_1$ and $332P_2$, at which the two analog temperature-representative signals appear. No further description of FIG. 6 is believed to be necessary for an understanding to the temperature control aspect of the invention.

In addition to control of the temperature of the heater as described above, controller 20 of FIG. 1a also performs further processing of the temperature information, together with memorized information, in order to determine the flow velocity through the path. The flow velocity v may be obtained by $$v = \left[ k_1 \left( \frac{E^2}{\Delta T R_{heater}} \right) - k_2 \right]^{\frac{1}{m}} \qquad 1$$

where
  $k_1$ is a constant dependent upon wall temperature and the Prandtl number ($N_{Pr}$), which is the ratio of molecular momentum to thermal diffusivity;
  $\Delta T$ is the temperature increment of the heater over the fluid
  $k_2$ is a correction factor dependent upon the characteristics of the heater 18, the material 34, and the connection between them;
  m is a power factor that is dependent upon the thermal electrical characteristics of the heater;
  $R_{heater}$ is the electrical resistance of the heater; and
  E is the voltage across the heater resistor.

In actual practice, the above equation (1), or equations obtained by similar derivations, may not provide as precise a reading or value as desired, due to the difficulty of determining the constants. A more precise value for the flow can be obtained by evaluating a polynomial, such as a $5^{th}$ order polynomial of the form $v = a + bx + cx^2 + dx^3 + ex^4 + fx^5$, and determining the values of the coefficients of the polynomial by a calibration of the flow sensor against a known reference flow sensor placed in-line with the flow sensor being calibrated. The processing required in the controller 20 of FIG. 1 to evaluate such equations is straightforward, and requires no further description.

Once the flow velocity is determined by use of the processing described above, the flow may be determined in terms of volumetric flow (volume per unit time) by multiplying the flow velocity by the effective cross-section of the path or pipe in which the fluid is flowing. Ordinarily, the area is simply determined from the diameter of the pipe in which the flow is occurring. The processor memory 21 will, for this purpose, be preprogrammed with the characteristics of the the flow sensor path. The mass flow rate (mass per unit time) is simply determined by multiplying the volumetric flow rate by the density of the fluid. For this purpose, the processor of controller 20 of FIG. 1a which performs the processing will be preprogrammed with the characteristics of the fluid measured and the physical dimensions of the fluid path. This information may be preprogrammed at the factory, or, if the type of fluid may change from time to time, the mass density characteristics may be uploaded to the processor memory by way of bus 20w of FIG. 1a or 340 of FIGS. 3,4,5,6, or 7. The resulting velocity, volumetric, or mass flow rate (or all of them) is transmitted from the sensor 10 over the bus 20w of FIG. 1a or 340 of FIGS. 3,4,5,6, and 7 to other locations for use such as monitoring or control purposes.

Figure 7:
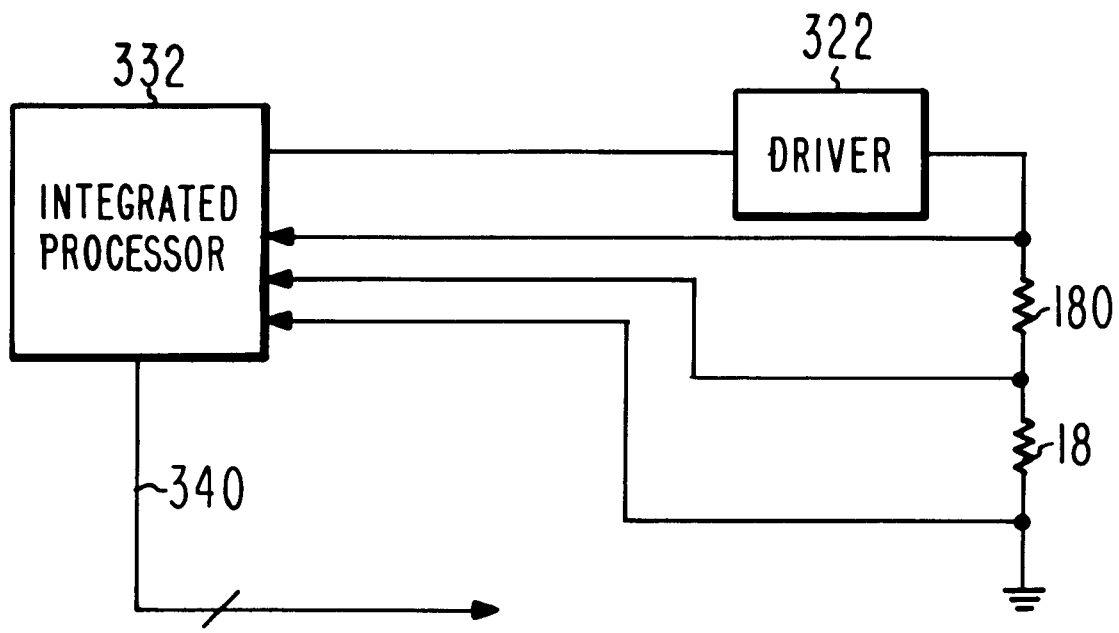
FIG. 7 is a detail of the processor and the measurement of the heater electrical characteristics.

In accordance with another aspect of the invention, the heater resistor is used to detect the temperature, thereby obviating the need for a physical temperature-measuring device such as 24 of FIG. 1a. More particularly, the heater is made from a material, such as nickel or platinum, whose resistance $R_{heater}$ changes with temperature, and the resistance of the heater is used as a measure of the temperature of the heater. In a first embodiment of this aspect of the invention, the heater is alternately provided with (a) heating current and (b) with temperature-sensing current (I) that is obtained by measuring the voltage across a precision resistor 180 as shown in FIG. 7; and with provision for measuring the voltages (E) across the precision resistor 180 and the heater resistor 18. In this arrangement, the resistance of the heater is determined during the (b) periods as the quotient of E/I, and this resistance is applied to a ROM for read-out of the corresponding temperature. Such an arrangement has the advantage of further reducing the number of parts in the assemblage, and substitutes solid-state control and processing for the heater temperature sensor.

As an alternative to time-division multiplexing of the temperature-sensing and power-applying functions associated with the heater, the power-applying function may be performed continuously, and the resistance determination for temperature determination may be performed by simply measuring the applied electrical voltage (E) and current (I), and taking the quotient of E/I.

Other embodiments of the invention will be apparent to those skilled in the art. For example, while the heating element has been described as being electrical, for convenience of control, the heat could instead be provided by a flame, by thermal conduction from a remote heat source, or the like. While only a single temperature sensor 24 is illustrated as being associated with the heater, and a single sensor 26 with the ambient temperature of the flow, those skilled in the art will recognize that plural or distributed temperature sensors spaced about the fluid flow path may be used to generate a more accurate equivalent temperature measurement. While the description of the operation of the flow sensor emphasizes that the heat transfer from the heater is the measured parameter, those skilled in the art will recognize that transfer of heat to the fluid necessarily heats the fluid, so the invention could as well be described in such terms. While the described embodiments of the invention do not have any flow impediments in the form of heaters projecting into the fluid path, other embodiments are possible in which the heater or temperature measuring device (s), or both, project into or through the fluid flow path. Further, while actual measurement of the upstream fluid temperature has been described, the downstream fluid temperature could be measured, and the measurement compensated (if necessary) for the power applied by the heater, to thereby determine or estimate the upstream temperature.

Thus, a flow sensor (10) according to an aspect of the invention includes a path (12) for the flow of fluid in a region. The fluid should have known thermal properties. A heating means or heater (18) is coupled to the path (12), for heat transfer to the fluid. A temperature determining means (24) or temperature sensor is coupled to the heater (18) to determine the temperature of the heater (18). A control arrangement (20) is coupled to heater (18) and to the temperature determining means (24) for applying power to the heater (18) in an amount required to keep or maintain the temperature of the heater (18) above the temperature of the fluid in path (12) and for converting the value of the electrical parameter into a corresponding flow value.

In a preferred embodiment of the invention, the control arrangement (20) includes a second temperature determining means or temperature sensor (26) coupled to the path (12) for a determination of the upstream temperature of the fluid. In a most preferred embodiment, the heater (18) is an electrical resistor, and the first temperature determining means (24) comprises electrical resistance measuring means coupled to the heater (18) for measuring the electrical resistance of the heater (18), and the control arrangement comprises means for converting the value of the resistance into a corresponding temperature of the heater (18).

The control arrangement (20) preferably includes a memory (21) preprogrammed with a value corresponding to the physical characteristics, such as the cross-sectional area, of the path (12), and the flow determination is generated in the form of an electrical parameter representing one of mass quantity per unit time and volume per unit time.

A method according to another aspect of the invention includes the steps of determining the temperature of a fluid flowing in a path (12), and applying power to a heater (18) thermally coupled to the flow for keeping the temperature of the heater (18) at a fixed temperature differential above the determined temperature of the fluid. Using at least information equivalent to or corresponding to the thermal characteristics of the fluid, the exposed area of the heater (18), the amount of power required to sustain the temperature differential, the power transfer characteristics per unit area of the heater (18) to the fluid, and the exposed area of the heater (18), the fluid flow or fluid velocity is determined. The flow is expressed in terms of electrical parameters representing volumetric flow, by the use of the fluid flow together with information equivalent to the cross-sectional area of the path (12) the flow may be given in terms of mass flow by the use of the volumetric flow, in combination with information equivalent to the density of the fluid.

What is claimed is:

1. A flow sensor, comprising:
   a path for the flow of a fluid in a region, said fluid having an associated temperature change per unit mass per unit of energy;
   heating means coupled to said path, for transferring heat from said heating means to said fluid, said heating means comprising a resistive element of fixed resistance;

temperature determining means coupled to said heating means for making a determination of the temperature of said heating means; and control means coupled to said heating means, for applying power to said heating means in an amount required to raise the temperature of said heating means above a reference temperature by a fixed predetermined amount, and for maintaining said fixed predetermined temperature differential between the reference temperature and the temperature of the heating means independent of flow by varying the power applied to the heating means, and for converting the value of said power into a signal representing a corresponding flow.

2. A flow sensor according to claim 1, further comprising:

second temperature determining means coupled to said path for determining the upstream temperature of said fluid in said path, wherein said reference temperature is obtained from said second temperature determining means.

3. A flow sensor according to claim 2, wherein said path is associated with a pipe having a peripheral wall, and wherein said second temperature determining means is at least thermally coupled to one of said peripheral wall and said heating means.

4. A flow sensor according to claim 1, wherein said path is associated with a pipe having a peripheral wall, and wherein said heater is in the form of a peripheral structure surrounding said peripheral wall, and in thermal contact therewith.

5. A flow sensor according to claim 4, wherein said fluid associated with said pipe produces a pressure on said peripheral walls of said pipe, and said peripheral wall of said pipe is made from conventional materials having a thickness commensurate with the temperature and said pressure of said fluid, except in a region in which at least one of said heater and said upstream temperature determining means are thermally coupled, in which region said peripheral wall is made from a material having higher strength than said conventional materials, of a thickness less than the thickness of said wall of said pipe which is made from conventional materials.

6. A flow sensor according to claim 1, wherein said control means comprises a memory preprogrammed with a value corresponding to the cross-sectional area of said path, and said flow determination is in the form of one of mass quantity per unit time and volume per unit time.

7. A flow sensor according to claim 1, wherein said control means comprises a memory programmed wit h the coefficients of a high order polynomial equation, said control means including means for evaluating said equation for flow determination.

8. A flow sensor according to claim 1, wherein said control means comprises a memory programmed with physical characteristics of the fluid to be measured, the programming of said memory being used to change the application of said flow sensor from one fluid to another.

9. A method for determining the flow of a fluid through a region, said method comprising the steps of:

determining the temperature of said fluid from one of a set of (a) predetermined and (b) dynamically determined values;

applying power to a heater having an area exposed to said fluid, said heater being thermally coupled to said flow for raising the temperature of said heater by a fixed temperature differential above said selected temperature; and maintaining said fixed temperature differential by measuring a voltage signal across a resistive element of fixed resistance in said heater and varying the power applied to the heater, thereby sustaining said fixed temperature differential; and determining the fluid flow using at least information associated with the power required to sustain said temperature differential.

10. A method according to claim 9, further comprising the step of determining the volumetric flow from (a) said fluid flow and (b) information equivalent to the cross-sectional area of said path.

11. A method according to claim 10, further comprising the step of determining the mass flow from (a) said volumetric flow and (b) said information equivalent to the mass density of said fluid.

12. A method for determining the flow of fluid through a region, the method comprising the steps of:

one of (a) determining and (b) estimating the temperature of a fluid flowing in a path;

applying power to a heater thermally coupled to said flow for raising the temperature of said heater by a fixed temperature differential above the temperature of the fluid;

maintaining said fixed temperature differential by measuring a voltage signal across a resistive element of fixed resistance in said heater and varying the power applied to the heater, thereby sustaining said fixed temperature differential; and determining the fluid flow using at least information associated with the power required to sustain said temperature differential.

13. A method according to claim 12, further comprising the step of determining the volumetric flow from (a) said fluid flow and (b) information equivalent to the cross-sectional area of said path.

14. A method according to claim 13, further comprising the step of determining the mass flow from (a) said volumetric flow and (b) information equivalent to the mass density of said fluid.

15. A flow sensor comprising:

a path for the flow of fluid, said fluid having an associated temperature change per unit mass per unit of energy in a region;

a heater coupled to said path, for transferring heat from said heater to said fluid, said heater comprising a resistive element of fixed resistance;

temperature determining means coupled to said heater for making a determination of the temperature of said heater based on the voltage across said fixed resistance; and control means coupled to said heater and to said temperature determining means, for applying power to said heater in an amount required to raise the temperature of said heater above a reference temperature by a predetermined amount, and for maintaining said fixed predetermined temperature differential between the reference temperature and the temperature of the heating means independent of flow by varying the power applied to the heater, and for converting the value of said power into a signal representing the corresponding flow.

16. A flow sensor, comprising:

a path for the flow of a fluid in a region, said fluid having an associated temperature change per unit mass per unit of energy;

a heater coupled to said path, for transferring heat to said fluid;

a temperature sensor coupled to said heater for determining the temperature of said heater;

a second temperature sensor coupled to said path for determining the upstream temperature of the fluid in said path defining a reference temperature; and a control arrangement responsive to said temperature sensor for applying power to said heater in an amount required to raise the temperature of said heater above the reference temperature by a fixed amount, and for maintaining said fixed temperature differential between the reference temperature and the temperature of the heater independent of flow by varying the power applied to the heater, and for converting the value of said power into a signal representing a corresponding flow.

\* \* \* \* \*